United States Patent [19]

Harrington

[11] Patent Number: 4,457,519

[45] Date of Patent: Jul. 3, 1984

[54] SEALING RING

[76] Inventor: George H. Harrington, 162 Graeser Ave., Bethel Park, Pa. 15102

[21] Appl. No.: 385,552

[22] Filed: Jun. 4, 1982

Related U.S. Application Data

[63] Continuation-in-part of Ser. No. 859,662, Dec. 12, 1977.

[51] Int. Cl.$^3$ ............................................... F16J 15/38
[52] U.S. Cl. ......................................... 277/65; 277/95
[58] Field of Search ......................... 277/65, 88, 89, 92

[56] References Cited

U.S. PATENT DOCUMENTS 2,993,711  7/1961  Peras ..................................... 277/65
3,680,977  8/1972  Rabouyt et al. ....................... 277/65

FOREIGN PATENT DOCUMENTS 1438455  4/1966  France ................................... 277/65

Primary Examiner—Robert I. Smith
Attorney, Agent, or Firm—William J. Ruano

[57] ABSTRACT

An annular seal of resilient material for creating a seal between a rotary shaft and a stationary member. The seal has an elongated mounting portion for embracing the surface of the shaft, an angularly extending intermediate portion which extends away from the mounting portion and stationary member, and an extremity portion extending angularly toward the stationary member with a sealing lip at its free end. A contact end surface is located at the end of the mounting portion on the end carrying the angularly extending intermediate portion. The sealing lip is in a first radial plane perpendicular to the center line of the mounting portion and the contact end surface being in a plane spaced from and parallel with the first plane in a static condition. By the above construction, the sealing lip will maintain a seal with the stationary member even at excessively high speeds of rotation. Also, because of the shape of the seal, it will be self-compensating as the result of wear thereof or axial movement of the shaft in a direction away from the seal.

5 Claims, 3 Drawing Figures

SEALING RING

This invention is a continuation-in-part of my patent application Ser. No. 859,662 filed Dec. 12, 1977.

The invention relates to a sealing ring for creating a seal between a rotating member and a stationary member. The rotating member will generally be a shaft which extends through the wall of a housing and is supported by bearings located within the housing. The sealing ring is supported on the shaft and rotates with the shaft.

While an effective seal is maintained in the construction described in my above-identified earlier application, an outstanding disadvantage is that at abnormally high speeds, particularly after long usage and consequent lessening of the elasticity of the sealing ring, the sealing lip tends to move away from the stationary member as the result of centrifugal force and thereby the effectiveness of the seal, as well as the retention of grease or other materials contained therein, is lost.

An object of the present invention is to provide a novel seal which will overcome the disadvantages of seals of the prior art as well as the seal described in my prior patent application indentified above.

A more specific object of the present invention is to provide a sealing ring of such construction that not only under normal speeds, but at excessively high speeds the sealing lip will not move away from the stationary member as a consequence of centrifugal force, but instead will maintain in effective sealing contact therewith.

Another object of the invention is to provide a sealing ring construction that enables constant contact of the sealing lip and stationary member at an optimum amount so as not to provide excessive friction, thereby reducing power consumption and adding to efficiency.

Other objects and advantages of the invention will become more apparent from the following decription taken with the accompanying drawing wherein.

Figure 1:
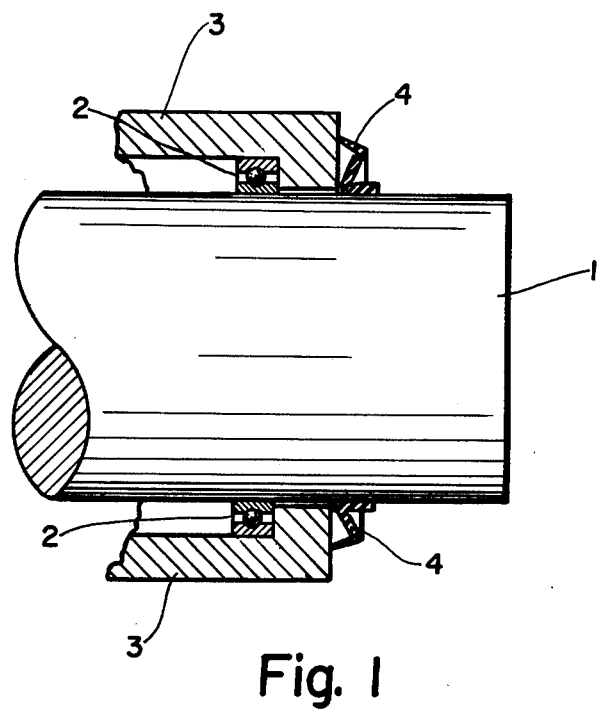
FIG. 1 is a partial vertical cross-sectional view through a sealing ring embodying the present invention shown mounted on a shaft.

Referring more particularly to the drawing, numeral 1 denotes a rotatable shaft which rotates on a ball bearing 2 or other anti-friction device relative to a stationary member 3 which may be a portion of a housing enclosing a motor or any other apparatus.

The sealing ring embodying the present invention is generally denoted by the numeral 4 and is made of an elastometer, such as rubber or other resilient or flexible material.

Figure 2:
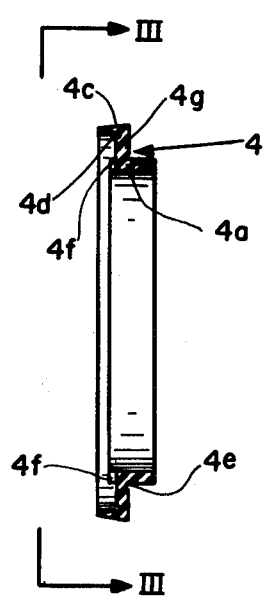
FIG. 2 is a vertical cross-sectional view of the sealing ring shown in FIG. 1 except that it is in an unexpanded condition.

FIG. 2 shows a sealing ring when removed from the shaft and in unextended or unexpanded condition. It comprises a cylindrical portion 4a of slightly smaller inner diameter than the outer diameter of shaft 1 so that when stretched onto shaft 1, it will form a tight fit thereon.

Figure 3:
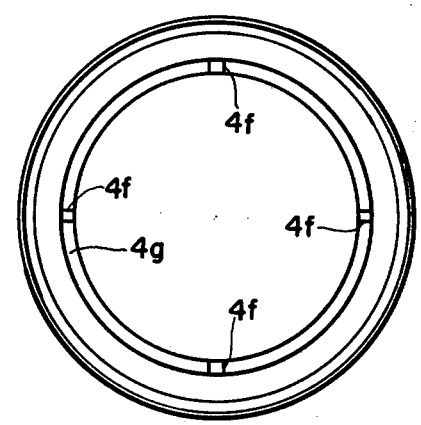
FIG. 3 is a view of the ring shown in FIG. 2 taken from the left side, that is, as viewed along lines III—III of FIG. 2.

Integrally extending radially from portion 4a is an intermediate portion 4g extending substantially at right angles thereto from one end of portion 4a. At the extremity of portion 4g is a tapered integral lip portion 4c extending substantially at right angles or at slightly more than right angles from portion 4g. The end of the lip portion 4c will form a seal with the stationary member 3. Grooves 4f are also provided as shown in FIG. 3 at 90° intervals around the ring to permit lubricating material passing through the space between the edge of the opening in wall 3 and the outer surface of shaft 1 to lubricate the sealing lip portion 4c where it contacts the surface of wall 3 as the shaft and sealing lip rotate. The grooves 4b also function as a relief passageway for bearing grease during the bearing greasing cycle. When the bearing is greased, excess grease passes through notches 4b into the cavity. If sufficient grease is present to overfill the cavity, the excess grease forces the sealing lip away from wall 3 and the excess grease passes out of the cavity. After greasing is completed the sealing lip will return to its sealing position against the housing wall and will reseal the shaft and the wall. Thus, the notches eliminate mechanical vents for removing excess grease from the bearing housing.

The sealing ring 4 of my invention is self positioning on the shaft relative to the housing wall through which the shaft extends. The portion of the sealing ring which engages the shaft is longitudinally dimensioned relative to the sealing lip so that when the sealing ring is inserted on the shaft and forced toward the housing wall, the end of the shaft engaging portion contacts the housing wall and at this location on the shaft the sealing lip is in sealing contact with the housing wall. Thus, the sealing ring is always located on the shaft with the sealing lip 4c in sealing relationship with the housing wall when the contact end surface of the shaft engaging portion is in contact with the housing wall.

In operation, after the sealing ring 4 is stretched and fitted over shaft 1 and slid to a position such that the end of the ring contacts the end of a stationary member 3, such as a housing, the ring 4 will be flexed or stretched to the position shown in FIG. 1, —that is, with the intermediate portion 4g at an acute angle to the cylindrical portion 4a and with the terminal portion 4c at an obtuse angle relative to the intermediate portion 4g, forming a somewhat Z shaped cross section as shown in FIG. 1. In such stretched position, a very effective seal is formed by lip portion 4c during not only static but dynamic conditions when the shaft is rotating at normal speeds.

An outstanding feature of the described construction of the sealing ring 4 is that even at abnormally high speeds, centriful force while moving the lip portion 4c generally radially outwardly, there will always be a tight and effective seal with the end of the stationary member or housing 3 at progressively greater diameters from the center line of shaft 1. Thus there will be no excessive grooving of the end portion of the housing. Moreover, any grease or other lubricating material contained in the void between the sealing ring 4 and the housing 3, as shown in FIG. 1, will be always retained in a place despite radially outward movements of the sealing lip portion 4c as the result of centrifugal force. Thus a very effective and sufficiently tight seal will be formed by the lip portion 13 against the housing 3 at all speeds of shaft 1, even excessively high speeds and in spite of a lessening of elasticity of the ring 4 through wear and age.

It will be noted, in FIG. 2, that the radial plane of the left end of the cylindrical portion 4a is spaced from the radial plane of the extremity or lip forming portion of the extremity portion 4c. This distance between the radial planes will vary depending upon the particular material of the sealing ring, that is, its elasticity and the speed at which shaft 1 rotates. In any event, the distance between these two radial planes, for the purpose of the present invention, will be such that a sufficiently tight and effective sealing contact with be made by the sealing lip at normal speeds and at even substantially higher speeds so that not only a good seal with the housing is maintained but any oil, grease or other lubricating materials, confined within the void of the sealing ring in contact with bearing 2, will not be lost as a result of centrifugal force. Centrifugal force will actually tend to tighten the seal at increasingly higher shaft speeds.

For a given shaft size and speed there is an optimum spacing between said radial planes for producing the least friction at the point of contact of the lip portion 4c, without sacrificing sealing contact, thereby increasing overall efficiency and decreasing power loss. Also the height of intermediate portion 4g affects the tightness of the seal as the result of centrifugal force.

Because of the somewhat Z shaped cross section when the seal is operative, the seal 4 becomes self compensating as the result of wear, since there is a continuous force tending to maintain a constant seal. Moreover, this same force compensates for any axial movement of the shaft away from the housing, thereby insuring a seal in spite of axial float of the shaft.

Thus it will be seen that I have provided an energy efficient rotary shaft seal of elastomer construction which seals in two areas, the shaft and the vertical plane through the sealing lip and which will relieve grease or any viscous lubricant through the sealing lip and will not score the shaft; which seal is axially self-positioning and will accept axial float, —also which is self compensating as the result of wear and which is extremely easy to mold for high volume, fast production runs; furthermore, I have provided a sealing member of such construction that centrifugal force tends to tighten the seal instead of loosening it as in other designs and wherein for a given shaft diameter and speed, there is an ideal spacing between the radial planes described above which will produce good sealing but minimal friction drag at the sealing lip, and at high speed, centrifugal force can relax the gripping tension of the sealing mounting portion of the shaft.

While I have illustrated and described a specific embodiment of may invention, it will be understood that this is by way of illustration only and that various changes and modifications may be contemplated in my invention within the scope of the following claims.

I claim:

1. An annular seal of resilient material for effecting a seal between a stationary member and a rotary shaft extending through said stationary member in a direction substantially perpendicular to a surface of said stationary member, said seal when relaxed, having a cylindrical mounting portion with a cylindrical passageway formed therethrough of slightly less diameter than said rotary shaft defining an elongated annular inner surface adapted to tightly embrace the outer surface of a shaft, also having an integral intermediate portion extending substantially radially outwardly from a position inwardly of one end of said mounting portion and having an extremity portion extending angularly at least 90° relative to said intermediate portion toward said stationary member and terminating in a sealing lip adapted to provide sealing contact with said stationary member, said sealing lip, when relaxed, having an end lying in a first radial plane perpendicular to the center line of said mounting portion, and said one end of said mounting portion lying in a second radial plane perpendicular to the center line of said mounting portion slightly inwardly of said first radial plane, the distance between said first and second radial planes being sufficiently great that centrifigual force at excessively high speeds of rotation of said shaft will always rotate said sealing lip towards said stationary member insuring a positive seal, whereby when said one end of said mounting portion is positioned on said shaft tightly against said stationary member, a tight fit is effected between the surface of said shaft and said annular inner surface of said mounting portion and whereby said intermediate and extremity portions are flexed to retain said seal in position on said shaft to that said lip constantly remains in sealing engagement with said stationary member irrespective of centrifugal force from rotation of said shaft.

2. A seal is recited in claim 1 wherein said extremity portion is substantially at right angles to said intermediate portion and extends in the direction of said stationary member.

3. A seal as recited in claim 1 wherein said extremity portion is tapered to form a smaller thickness at its lip which forms a seal with said stationary member.

4. A seal as recited in claim 1 together with groove means in said one end of said mounting portion for permitting passage of lubricating means therethrough and into a space defined by said intermediate and extremity portions of said seal and said stationary member so as to contact said lip.

5. A seal as recited in claim 4 wherein said groove means comprises a plurality of radially extending grooves spaced along the periphery of said one end of said mounting portion.

* * * * *